United States Patent

[11] 3,609,057

[72] Inventor Leland J. Radtke
North Palm Beach, Fla.
[21] Appl. No. 46,366
[22] Filed June 15, 1970
[45] Patented Sept. 28, 1971
[73] Assignee United Aircraft Corporation
East Hartford, Conn.

[54] TURBINE COOLANT FLOW SYSTEM
8 Claims, 1 Drawing Fig.
[52] U.S. Cl. .................................................... 415/59,
415/115, 415/116, 415/175, 416/95, 60/39.66,
60/39.58
[51] Int. Cl. ....................................................... F01d 1/04,
F01d 5/06, F03b 11/00
[50] Field of Search ........................................... 415/116,
59, 115, 175, 176, 55; 416/95, 96, 97; 60/39.66,
39.52, 39.54, 39.58, 39.08

[56] References Cited
UNITED STATES PATENTS

| | | | |
|---|---|---|---|
| 2,915,337 | 9/1960 | Atkinson | 60/39.08 |
| 3,034,298 | 5/1962 | White | 60/39.66 |
| 3,528,241 | 9/1970 | Venable et al. | 60/39.08 |
| 3,535,873 | 10/1970 | Szydlowski | 416/95 X |

Primary Examiner—Carlton R. Croyle
Assistant Examiner—Richard E. Gluck
Attorney—Jack N. McCarthy ABSTRACT: A two-stage turbine is disclosed having a vane upstream of a first stage turbine and a vane between the two turbine stages. A hot gas flows into the turbine from a hot gas generator and it exhausts from an exit end. Sealing means are provided between the rotating turbines and the fixed structure forming the inner side of the annular hot gas flow passage through the turbine. A chamber is formed adjacent the sealing means at the inlet to the first stage turbine. A coolant is directed to said chamber with the pressure regulated so that in operation fluid will flow inwardly through the sealing means from the hot gas flow passage to said chamber. The fluid mixture from the chamber passes to the rear side of the turbine disk where the pressure is now greater than the pressure in the hot gas flow passage so that at the sealing means at the rear side of the first stage turbine the coolant flows into said passage. In the second stage turbine, the pressures of the coolant and hot gases are such that the coolant flows outwardly into the hot gas flow passage. A dome-shaped manifold receives coolant from a supply and directs it through passageways to the chamber. The sizing of the sealing means at various locations controls the amount of leakage flow. The invention herein described was made in the course of or under a contract with the Department of the Air Force.

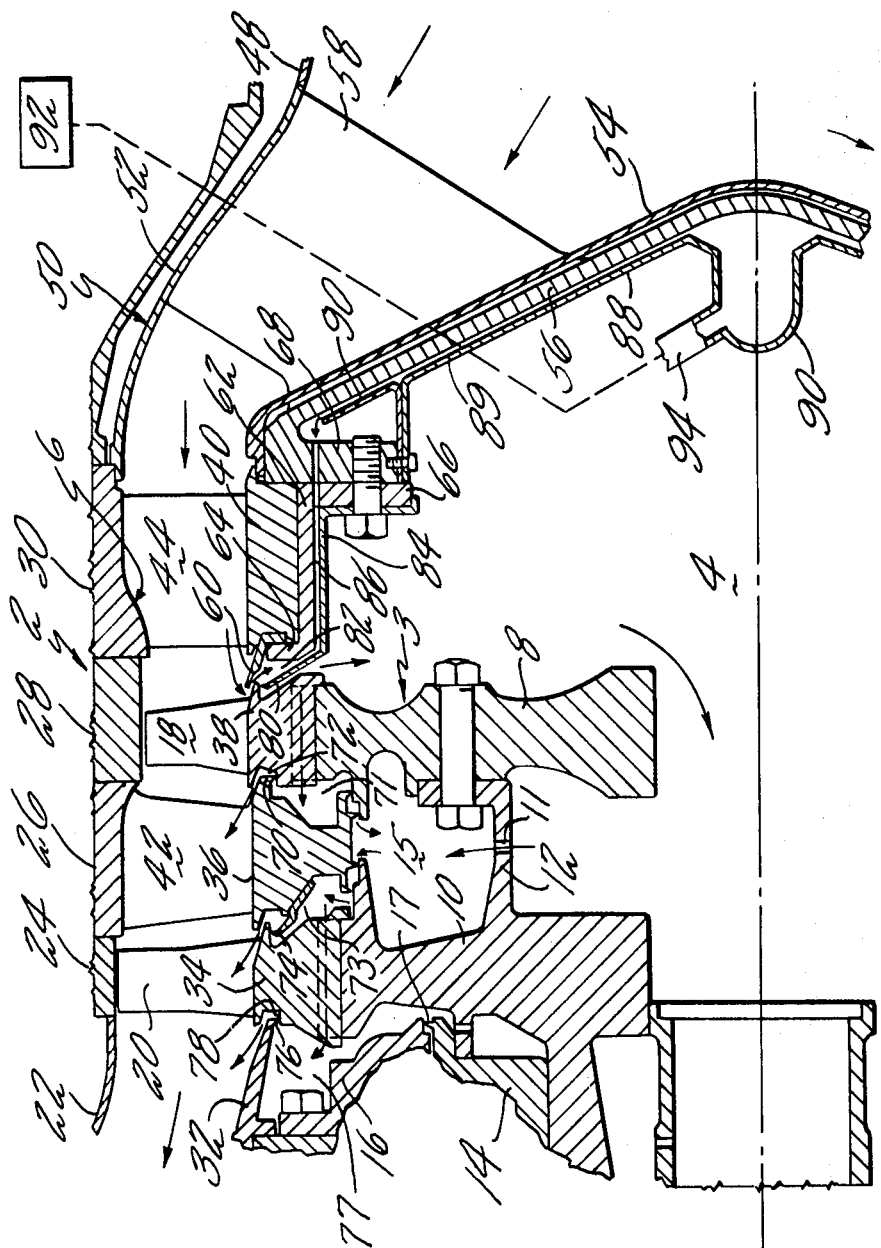
INVENTOR
LELAND J. RADTKE
BY Jack N. McCarthy
AGENT 3,609,057

TURBINE COOLANT FLOW SYSTEM

BACKGROUND OF THE INVENTION

Typical turbine rotor cooling schemes subject the rotor, within the boundary represented by the main flow path inner wall, to a coolant environment which is at a pressure higher than at any seal location along the wall. This is done to prevent inflow of hot flow path gases, but results in coolant leakage into the flow path which degrades efficiency. The arrangement set forth herein eliminates this degradation.

SUMMARY OF INVENTION

An object of the invention is to control the leakage of coolant into the main flow path and the leakage of main flow into the coolant path and thereby reduce the amount of coolant required to cool the rotor, reduce thermodynamic cycle inefficiency caused by said leakage, and reduce aerodynamic disturbances.

Another object of the invention is to provide a mixing chamber adjacent the sealing means at the inlet of a turbine so that fluid from a hot gas flow passage can be mixed with a coolant therein and directed inwardly to an area within the turbine for cooling parts therein. In this construction, the sizing of the passageways and openings are controlled to obtain the desired amount of flow. It is also an object to control the temperature of the mixture where it occurs to ensure that the resultant temperature is low enough to perform its intended function.

BRIEF DESCRIPTION OF THE DRAWING

The figure shown is a sectional view taken through the upper half of a two-stage turbine showing the invention.

DESCRIPTION OF THE PREFERRED EMBODIMENT

Referring to the figure, a two-stage turbine assembly 2 is shown with a rotor section 3 mounted for rotation in the inner cavity 4 of a composite housing with an annular passageway 6 therearound.

The rotor section 3 comprises a rotor disk 8 for the first stage of the turbine assembly and a rotor disk 10 for the second stage of the turbine assembly. A flange 12 extends from the disk 10 and is bolted to the disk 8. This flange 12 has a plurality of openings 11 therein to connect cavity 4 with cavity 15. The disk 10 is connected to a member 14 which is mounted for rotation within a fixed member 16 of the housing. A seal 17 is provided therebetween.

The first turbine disk 8 has a plurality of turbine blades 18 mounted therearound in a conventional manner with the roots of the blades having a root shape which is received by mounting recesses in the outer periphery of the disk. The blades are held in place by a blade retaining means. A blade root and disk construction is shown in U.S. Pat. No. 2,753,249. The second turbine disk 10 has a plurality of turbine blades 20 mounted therearound such as the first turbine disk.

The annular passageway 6 has its outer surface formed by the inner surfaces of a plurality of annular members 22, 24, 26, 28 and 30 which are fixedly mounted together. While the outer portion of the members is not shown, they can be held together by through-bolts or other means desired.

The inner surface of the passageway 6 is formed by the outer surfaces of a plurality of inner members 32, 34, 36, 38 and 40. Members 32, 36 and 40 are fixedly mounted but members 34 and 38 are made up of the platform of the blades 20 and 18, respectively, and therefore rotate.

The inner surface of member 22 forms an annular exit with the outer surface of member 32. The member 32 is fixedly connected to the member 16 of the housing. Blades 20 extend radially outwardly from their platforms 34 with the tips of the blades being spaced from the inner surface of member 24. The inner surface of member 26 is connected to the outer surface of member 36 by a plurality of vanes 42. These vanes 42 properly position the member 36 and fix it in position. Blades 18 extend radially outwardly from their platforms 38 with the tips of the blades being spaced from the inner surface of member 28. The inner surface of member 30 is connected to the outer surface of member 40 by a plurality of vanes 44. These vanes 44 properly position the member 40 and fix it in position. The forward edges of the inner surface of member 30 and the outer surface of member 40 form the inlet to annular passageway 6.

Gases from a hot gas generator (not shown) are delivered to the inlet of passageway 6 from a passageway 48 through an outwardly extending flow connector 50. The flow connector is formed by a duct member 52 connecting passageway 48 with the forward edge of the inner surface of member 30 and a dome-shaped plate member 54 placed within duct member 52 with its outer edge connected to the forward edge of member 40. Structural strength is given plate member 54 by a dome-shaped member 56 which is nested in member 54 and extends to the member 40. An annular flange 68 extends inwardly from member 56 and is fixed to member 40 in a manner to be hereinafter described. A plurality of struts 58 connect the duct member 52 and plate member 54 to the member 56. These members are fixed together such as by welding.

Since the inner surface of annular passageway 6 is formed by stationary and rotating surfaces then sealing means must be provided therebetween to minimize or control the leakage. In the space between the rear edge of the surface of fixed member 40 and the forward edge of the surface formed on rotatable platforms 38 and a flange member 60, shaped as a frustum of a cone, is fixed to member 40 and extends rearwardly and outwardly to surround the forward edge of the surface on platform 38. This overlapping is controlled to obtain a desired annular seal opening at this location for a purpose to be hereinafter described.

The flange member 60 is held in place by an inner portion positioned in an annular recess in the rearward face of member 40. A clamping device 62 has an outwardly extending flange 64 which holds the portion of member 60 in the recess and an inwardly extending flange 66 which is bolted to flange 68 to fix dome-shaped member 56 to the member 40.

In the space formed between the rotating blades 18 and stationary member 36 the rear edge of the platforms 38 extend over the forward surface of member 36 with a seal being formed radially inwardly by an annular knife edge 70 extending from member 36 to a cylindrical surface 72 formed in the rear of the blades below the platforms 38. The member 36 extends further inwardly and a second seal is formed by two knife edges on member 36 which extend inwardly to a flange extending rearwardly from the disk 8.

In the space formed between the stationary member 36 and the rotating blades 20 the member 36 has a rearwardly extending flange which extends over the forward surface of the platforms 34 with a seal being formed radially inwardly by an annular knife edge 74 extending from member 36 to the under surface of the platform 34. Knife edge 74 is formed on a separate member fixed to the member 36. A second seal is formed by two knife edges on member 36 which extend inwardly to a flange extending forwardly from the disk 10.

In the space formed between the rotating blades 20 and stationary member 32 the platforms 34 extend over the forward surface of member 32 with a seal being formed radially inwardly by an annular knife edge 76 extending from member 32 to a cylindrical surface 78 formed in the rear of the blades below the platforms 34.

An annular flange 80 projects along, and is spaced from, the forward side of the blade roots with its outer knife edge spaced a small predetermined distance from the under surface of the platforms 38. This flange forms an annular mixing chamber 82 with the flange 64 and flange member 60. The inner edge of the flange 80 is connected to a cylindrical member 84, which is in turn fixed in place by being bolted through an integral flange to the flanges 66 and 68. The cylindrical member 84 and connecting end of flange 80 forms an annular passageway 86 with the clamping device 62.

The annular chamber 82 has three openings connected to it, (1) one opening between the flange member 60 and the platforms 38, (2) one opening between the flange 80 and the platforms 38, and (3) passageway 86.

Flanges 66 and 68 have a plurality of aligned and sized openings therearound which open into the end of the annular passageway 86. A dome-shaped manifold plate 88 is nested within member 56 and forms a manifold 89 therewith. A portion of the plate 88 is enlarged at 90 to form a small chamber with the member 56. The upper edge of the plate 88 is fixed by a flange to the end of the flange 68. A small section of plate 90 is provided to carry the flow in the manifold up to the outer edge of the member 56 adjacent the openings therein. This plate 90 has a flange which is also fixed to the end of the flange 68.

A coolant supply is located at 92 and it is connected by a conduit 94 to the enlarged portion 90 of the plate 88. It can be seen that the manifold 89 is connected to the chamber 82 by the aligned openings in flanges 68 and 66, and the passageway 86.

In operation a coolant is directed to the chamber 82 at a pressure which is less than that in the hot gas flow passage at that location and the opening between the member 60 and platforms 38 is fixed to permit a predetermined flow therein depending on the pressure of the coolant fluid in the chamber 82. The opening between the flange 80 and the underside of the platforms 38 is fixed to obtain a desired flow from said chamber which will keep the temperature of the fluid mixture at a proper value and maintain the flow direction from the hot gas flow passage into the mixing chamber. In the figure shown the remainder of the sealing means are spaced to provide for outward flow of coolant between each of the locations where stationary and rotary parts meet since the pressure in the cavity 4 is greater than that in the passageway 6 at these locations.

As the mixed fluid flows between the flange 80 and the forward side of the roots of the blades 18, a portion thereof passes to the rear side of the blades into the chamber 71 through the spaces provided between the blade roots and the root openings in the disk which hold the blades in place. The remaining mixed fluid flows into inner cavity 4, thence to the cavity 15 at the rear side of the disk 8 through openings 11. From this chamber 71 the mixed fluid flows between the knife edge 70 and the surface 72 into the gas flow passage, and through the second seal formed between member 36 and disk 8 into the cavity 15.

The fluid in cavity 15 flows past the second seal formed between member 36 and disk 10 to the cavity 73 adjacent the forward side of the roots of the blades 20. From this cavity 73 a portion of the fluid flows to chamber 77 at the rear side of the blades 20 through the spaces provided between the blade roots and the root openings in the disk. The remaining flow from cavity 73 passes between the knife edge 74 and the under surface of the platforms 34 into the gas flow passage. The fluid in chamber 77 flows between the knife edge 76 and the surface 78 into the gas flow passage.

While a mixing chamber is not shown in conjunction with the second turbine, it is within the scope of the invention to provide one. Its operation would be similar to that shown for the mixing chamber in conjunction with the first stage turbine.

We claim:

1. A turbine construction having in combination, a housing, a turbine rotor mounted therein for rotation, and annular passageway having inner and outer walls, said turbine rotor having blades thereon which project into said passageway, said turbine rotor having platform means which forms a rotating portion of said inner wall, an annular space being formed between said rotating portion and the adjacent portion of the inner wall, a chamber being formed in said housing, said chamber being connected to said annular passageway for receiving fluid from said passageway, a coolant supply means connected to said chamber for directing a coolant from said supply to said chamber, said chamber having an outlet for directing the mixed fluid formed in said chamber outwardly therefrom.

2. A turbine construction as set forth in claim 1 wherein said chamber has an annular opening into which said platform means projects, a first and second annular opening being formed between the platform means and the edges of the opening being formed between the platform means and the edges of the opening in the chamber, one opening providing the connection to the annular passageway while the other opening provides the outlet from said chamber.

3. A turbine construction as set forth in claim 1 wherein said chamber is connected to said inner wall and includes as two sides thereof an inner and outer flange projecting towards said turbine rotor, said outer flange projecting over said platform means and said inner flange projecting under said platform means, the opening formed between the outer flange and the platform providing the connection to the annular passageway and the opening formed between the inner flange and the platform providing the outlet from said chamber.

4. A turbine construction as set forth in claim 1 wherein one wall of said chamber is formed by an annular flange projecting into said annular space to a point adjacent the inner platform means, said flange forming an annular outlet passageway with the cooperating side of said turbine rotor, said flange also forming a passageway with said wall to form a passageway for admitting the coolant to said chamber.

5. A turbine construction as set forth in claim 1 wherein a second turbine rotor is mounted therein for rotation, said rotors being connected together, said mixed fluid being directed from said chamber to said turbine rotors for cooling them.

6. A turbine construction as set forth in claim 1 wherein a second annular space is formed between said rotating portion and the other adjacent portion of the inner wall, passage means through said turbine rotor for directing mixed fluid from said outlet to said second annular space, said mixed fluid being directed into said annular passageway.

7. A turbine construction as set forth in claim 1 wherein the mixed fluid is directed on to said turbine rotor for cooling it.

8. A turbine construction having in combination, a housing, a turbine rotor mounted in a cavity in said housing for rotation, said turbine rotor having blades, said housing having an inlet communicating with said blades, and an outlet for receiving the discharge from said blades, said turbine rotor having a platform mounted thereon, said housing defining a chamber having an opening therein, said platform extending into said opening and defining therewith a first opening and a second opening, a source of coolant, means for connecting said source to said chamber for directing a coolant thereto, said first opening bleeding a portion of the gases from said inlet into said chamber for mixing with said coolant, said second opening providing a discharge for said fluid mixture from said chamber.